(12) United States Patent
Sun et al.

(10) Patent No.: US 12,572,231 B2
(45) Date of Patent: Mar. 10, 2026

(54) WINDABLE DISPLAY DEVICE WITH TOUCH FUNCTION ON REAR SIDE AND METHOD FOR CONTROLLING THE SAME

(71) Applicant: BOE Technology Group Co., Ltd., Beijing (CN)

(72) Inventors: Kuo Sun, Beijing (CN); Bo Wang, Beijing (CN); Renrong Gai, Beijing (CN); Rui Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/697,794

(22) PCT Filed: Feb. 28, 2023

(86) PCT No.: PCT/CN2023/078648
§ 371 (c)(1),
(2) Date: Apr. 2, 2024

(87) PCT Pub. No.: WO2023/174048
PCT Pub. Date: Sep. 21, 2023

(65) Prior Publication Data
US 2025/0004585 A1     Jan. 2, 2025

(30) Foreign Application Priority Data
Mar. 18, 2022    (CN) .......................... 202210271858.6

(51) Int. Cl.
G06F 3/041        (2006.01)
G06F 1/16         (2006.01)
G06F 3/044        (2006.01)

(52) U.S. Cl.
CPC .......... *G06F 3/0412* (2013.01); *G06F 1/1624* (2013.01); *G06F 1/1652* (2013.01);
(Continued)

(58) Field of Classification Search
CPC .... G06F 1/1624; G06F 1/1643; G06F 1/1652; G06F 3/041; G06F 3/0412;
(Continued)

(56) References Cited

U.S. PATENT DOCUMENTS

2019/0317550 A1* 10/2019 Kim ....................... H04N 23/54
2020/0310586 A1   10/2020 Ding et al.
(Continued)

FOREIGN PATENT DOCUMENTS

CN        112181205 A      1/2021
CN        113093943 A      7/2021
(Continued)

OTHER PUBLICATIONS

Machine translation of CN_112181205 (Ref 5 in IDS Sep. 25, 2024) (Year: 2021).*
(Continued)

*Primary Examiner* — Liliana Cerullo
(74) *Attorney, Agent, or Firm* — XSENSUS LLP

(57)                ABSTRACT
A touch display device and a method for controlling the same are provided. The touch display device includes a flexible display panel, a cover plate, and a first touch layer group. The flexible display panel includes a first display section and a second display section; the first display section and the second display section are arranged opposite to each other; the cover plate is provided on a side of the second display section away from the first display section; and the first touch layer group is provided on a side of the cover plate close to the second display section, and there is a gap between the first touch layer group and the second display section.

16 Claims, 7 Drawing Sheets

(52) U.S. Cl.
CPC ........ *G06F 3/04164* (2019.05); *G06F 3/0445*
(2019.05); *G06F 3/0446* (2019.05)

(58) Field of Classification Search
CPC .... G06F 3/04164; G06F 3/044; G06F 3/0445;
G06F 3/0446; G06F 2203/04102
See application file for complete search history.

(56) References Cited

U.S. PATENT DOCUMENTS

| | | | | |
|---|---|---|---|---|
| 2021/0303121 A1* | 9/2021 | Ku | .................... | H10K 77/111 |
| 2021/0405803 A1* | 12/2021 | Ye | ...................... | G06F 3/0446 |
| 2022/0291716 A1* | 9/2022 | Kishimoto | ............. | B32B 15/20 |
| 2023/0122323 A1* | 4/2023 | Kwak | .................. | G06F 3/0448 |
| | | | | 361/679.27 |

FOREIGN PATENT DOCUMENTS

| | | | |
|---|---|---|---|
| CN | 215494959 U | 1/2022 | |
| CN | 114063823 A | 2/2022 | |
| CN | 217426092 U | 9/2022 | |
| WO | 2022/033244 A1 | 2/2022 | |

OTHER PUBLICATIONS

International Search Report and Written Opinion mailed on May 24, 2023, in corresponding PCT/CN2023/078648, 11 pages.
The First Office Action mailed May 19, 2025, in Chinese Application No. 202210271858.6, 25 pages including English translation.

* cited by examiner

3c（312）        3d

3

3a（311）    2    3a（311）    3b 32
321   322   321

33

311

312    31

311

Y

X   71

34

WINDABLE DISPLAY DEVICE WITH TOUCH FUNCTION ON REAR SIDE AND METHOD FOR CONTROLLING THE SAME

CROSS-REFERENCE TO RELATED APPLICATIONS

The present disclosure is the U.S. national phase application of International Application No. PCT/CN2023/078648 filed on Feb. 28, 2023, and claims priority to Chinese Patent Application No. 202210271858.6, filed on Mar. 18, 2022 and entitled "TOUCH DISPLAY DEVICE AND METHOD FOR CONTROLLING THE SAME", the entire contents of each are incorporated herein by reference for all purposes.

TECHNICAL FIELD

The present disclosure relates to the field of display technology, in particular to a touch display device and a method of controlling the touch display device.

BACKGROUND

With the advancement of technology and the improvement of social living standards, consumers have increasingly higher requirements for display products. Currently, a new generation of slidable and windable display devices has been developed, which can change an area of the display screen.

It should be noted that the information disclosed in the above section is only intended to enhance the understanding of the background of the present disclosure, and thus can include information that does not constitute the prior art already known to those skilled in the art.

SUMMARY

According to one aspect of the present disclosure, a touch display device is provided, including: a flexible display panel including a first display section and a second display section, wherein the first display section and the second display section are arranged opposite to each other; a cover plate arranged on a side of the second display section away from the first display section; and a first touch layer group arranged on a side of the cover plate close to the second display section, wherein a gap is provided between the first touch layer group and the second display section.

According to another aspect of the present disclosure, a method of controlling a touch display device is provided, the method is configured for controlling any of the above touch display devices, and the control method includes: receiving an operable sliding state of the touch display device; and controlling, in response to the operable sliding state of the touch display device being a winding state, the first touch layer group to operate.

It should be understood that the general description in the above and the detailed description in the following are only illustrative and explanatory, and do not limit the present disclosure.

BRIEF DESCRIPTION OF THE DRAWINGS

The drawings, which are incorporated in and constitute a part of this specification, illustrate embodiments consistent with the present disclosure and serve together with the specification to explain principles of the present disclosure. It is apparent that the drawings in the following description are only some embodiments of the present disclosure, and for those of ordinary skill in the art, other drawings can also be obtained from these drawings without creative efforts.

EXPLANATIONS OF REFERENCE NUMERALS

Figure 1:
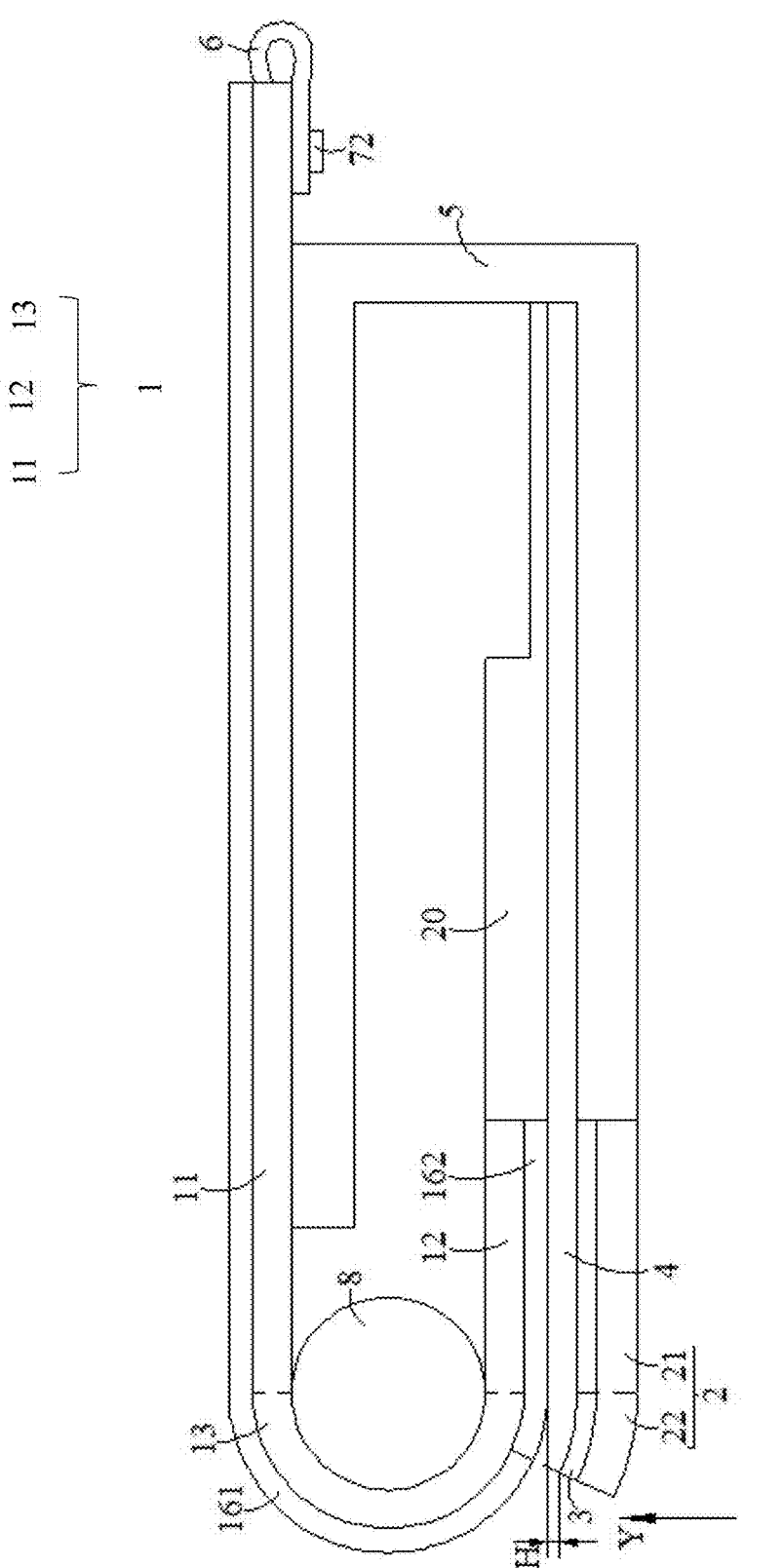
FIG. 1 is a schematic diagram of a structure of a display device in a winding state according to embodiments of the present disclosure.

1. Flexible display panel; 11. First display section; 12. Second display section; 13. Third display section;
14. Display backplane; 141. Base substrate; 142. Shielding layer; 143. Buffer layer; 144. Active layer; 145. Gate insulation layer; 146. Gate; 147. Interlayer dielectric layer; 1481. Source; 1482. Drain; 149. Planarization layer; 150. First electrode; 151. Pixel definition layer; 152. Light-emitting layer group; 153. Second electrode; 154. Encapsulation layer group;
16. Second touch layer group; 16a. Third touch metal layer; 16b. Third touch insulation layer; 16c. Fourth touch metal layer; 16d. Fourth touch insulation layer;
161. First part; 162. Second part;
163. Third touch unit; 1631. Third touch electrode; 1632. Third connection portion;
164. Fourth touch unit; 1641. Fourth touch electrode; 1642. Fourth connection portion;
165. Second touch driving lead; 166. Second touch sensing lead; 167. Third touch driving lead; 168. Third touch sensing lead; 169. Spacing portion;
17. Polarizer; 18. Adhesive layer; 19. Covering layer; 20. Connection structure;
2. Cover plate; 21. Flat portion; 22. Curved portion;
3. First touch layer group; 3a. First touch conductor layer; 3b. First touch insulation layer; 3c. Second touch conductor layer; 3d. Second touch insulation layer;
31. First touch unit; 311. First touch electrode; 312. First connection portion;
32. Second touch unit; 321. Second touch electrode; 322. Second connection portion;
33. First touch sensing lead; 34. First touch driving lead;
4. Gap; 5. Fixed bracket; 6. Flexible circuit board;
71. First touch chip; 72. Second touch chip; 8. Scroll;
X. First direction; Y. Second direction; Z. Third direction.

DETAILED DESCRIPTION

Example embodiments will now be described more fully with reference to the drawings. Example embodiments, however, can be embodied in a variety of forms and should not be construed as being limited to examples set forth herein. Instead, these embodiments are provided so that the present disclosure will be thorough and complete, and will fully convey concepts of the example embodiments to those skilled in the art. The same reference numerals in the drawings represent the same or similar structures, and thus their detailed descriptions will be omitted. In addition, the drawings are only illustrative and are not necessarily drawn to scale.

Although relative terms such as "up" and "down" are used in this specification to describe the relative relationship between one illustrative component and another illustrative component, these terms are only used for convenience in this specification, for example, according to an example direction described in the drawings. It can be understood that if the illustrative device is flipped so that it is upside down, the component described as "up" will become the component described as "down". When a certain structure is "on" other structures, it may mean that a structure is formed integrally on the other structures, or a structure is "directly" arranged on the other structures, or a structure is "indirectly" arranged on the other structures through another structure.

Terms "one", "a", "the", "said", and "at least one" are used to indicate the existence of one or more elements/components/etc. Terms "include" and "has" are used to indicate open inclusion and refer to the existence of additional elements/components/etc. in addition to the listed ones. Terms "first", "second", and "third" are only used as reference numerals and are not intended to limit the quantity of objects.

Embodiments of the present disclosure provide a touch display device, as shown in FIGS. 1 to 7. The display device can include a flexible display panel 1, a cover plate 2, and a first touch layer group 3. The flexible display panel 1 includes a first display section 11 and a second display section 12, and the first display section 11 and the second display section 12 are arranged opposite to each other. The cover plate 2 is arranged on a side of the second display section 12 away from the first display section 11. The first touch layer group 3 is arranged on a side of the cover plate 2 close to the second display section 12, and there is a gap 4 between the first touch layer group 3 and the second display section 12.

In the touch display device provided by the present disclosure, the first touch layer group 3 is adhered to the cover plate 2. When the touch display device is in a winding state, a rear surface of the touch display device can sense external touch actions through the first touch layer group 3, to achieve the touch function. Moreover, there is a gap 4 between the first touch layer group 3 and the second display section 12, and thus the first touch layer group 3 and the cover plate 2 will not affect the spreading of the second display section 12. Furthermore, the cover plate 2 can also provide protection for the second display section 12, avoiding wear and tear on the second display section 12.

Figure 2:
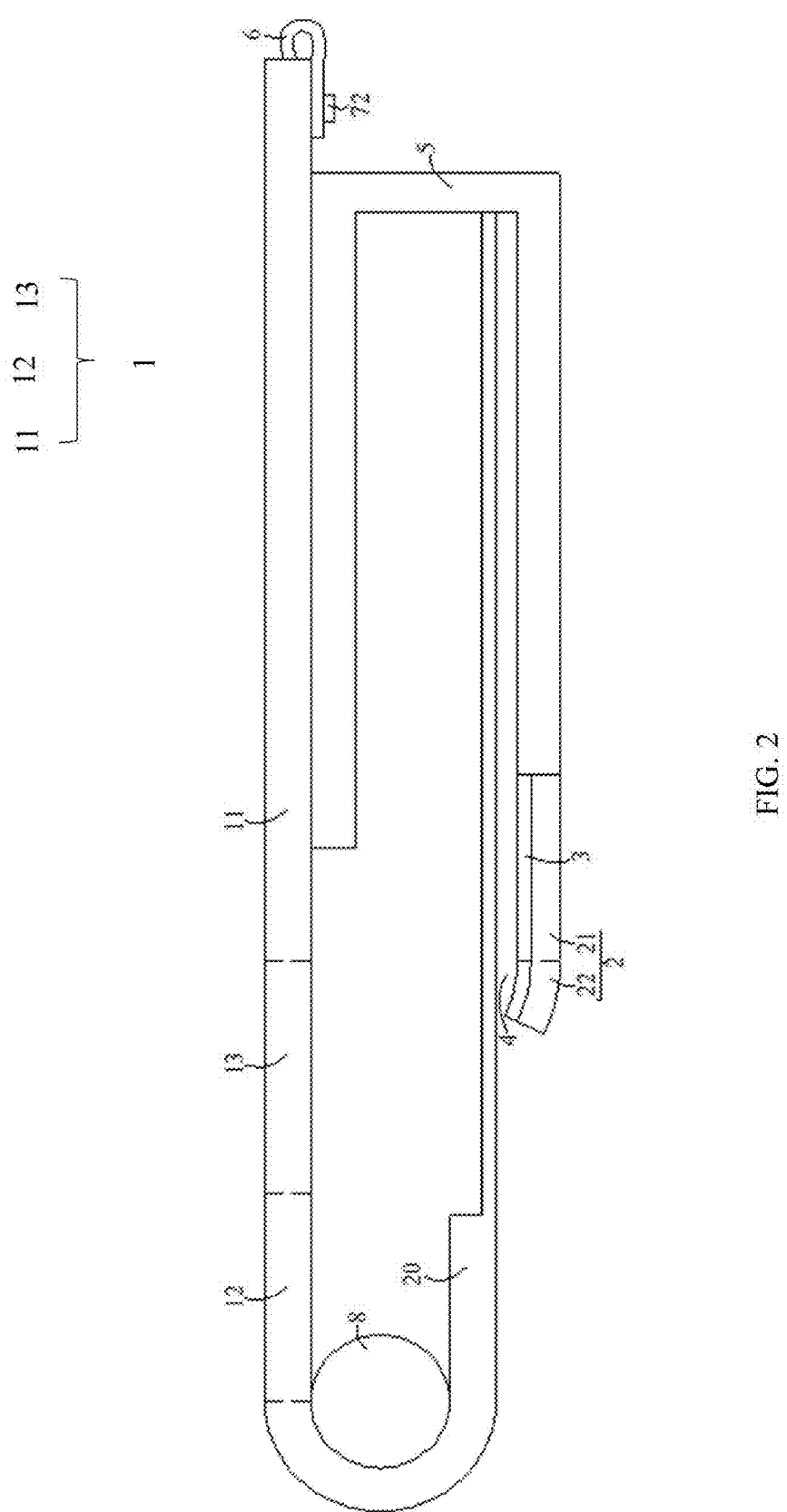
FIG. 2 is a schematic diagram of a structure of a display device in FIG. 1 in a spreading state.

In some embodiments of the present disclosure, the touch display device can be a slidable and windable display device. As shown in FIGS. 1 and 2, the touch display device can include a fixed bracket 5, and a part of the flexible display panel 1 is fixed on the fixed bracket 5. A scroll 8 is arranged inside the fixed bracket 5, and a part of the flexible display panel 1 is wound on the scroll 8. The scroll 8 can move and rotate to drive the flexible display panel 1 to roll up or to spread. One end of the flexible display panel 1 is further connected to a connection structure 20, and the connection structure 20 is connected to the fixed bracket 5. The other end of the flexible display panel 1 is provided with a flexible circuit board 6, and a second touch chip 72 is arranged on the flexible circuit board 6. The cover plate 2 is also arranged above the fixed bracket 5.

It should be noted that a structure of the touch display device is explained based on a structure of the touch display device in the winding state.

As shown in FIG. 1, when the flexible display panel 1 is in the winding state, the flexible display panel 1 can include a first display section 11, a second display section 12, and a third display section 13. The first display section 11 and the second display section 12 are arranged opposite to each other, and both the first display section 11 and the second display section 12 are provided in a flat shape. The third display section 13 is connected between the first display section 11 and the second display section 12, and the third display section 13 is provided in a curved shape. The first display section 11 is a fixed section located on a front surface of the touch display device. The second display section 12 and the third display section 13 are slidable and windable sections. The second display section 12 is located on a rear surface of the touch display device, and the third display section 13 is located on a side surface of the touch display device. A display area of the second display section 12 is smaller than a display area of the first display section 11.

As shown in FIG. 2, when the flexible display panel 1 is in a spreading state, both the second display section 12 and the third display section 13 are spread and form a display plane coplanar with the first display section 11, and both the second display section 12 and the third display section 13 are located on the front surface of the touch display device.

Reference continues to be made to FIG. 1, the cover plate 2 is arranged on the rear surface of the touch display device, that is, the cover plate 2 is arranged on a side of the second display section 12 away from the first display section 11. The cover plate 2 can protect the second display section 12 from wear and tear. The cover plate 2 is arranged in fixed manner, that is, the cover plate 2 is located on the rear surface of the touch display device all along, regardless of whether the flexible display panel 1 is in the winding state or the spreading state. Moreover, the cover plate 2 cannot be bonded to the second display section 12, for bonding the cover plate 2 to the second display section 12 will prevent the flexible display panel 1 from spreading. As a result, a gap 4 is formed between the cover plate 2 and the second display section 12, and the gap 4 can be an air gap 4. Due to the presence of air gap 4, the second display section 12 is unable to sense external touch actions when the flexible display panel 1 is in the winding state, resulting in the inability to generate touch signals and achieve the touch function.

Reference is made to Table 1, which shows a comparison of simulated copper pillar data between a conventional touch display device and a touch display device with an air gap. The diameter of the copper pillar is approximately 7 mm. In the table, Cm is the coupling capacitance generated between a touch driving electrode Tx and a touch sensing electrode Rx, without copper pillar touch, also known as the mutual capacitance of Tx/Rx. Cm' (not shown in the Table) is the mutual capacitance between the touch driving electrode and the touch sensing electrode when the copper pillar touch is applied. $\Delta Cm$ is a value of Cm−Cm'. $\alpha Cm/Cm$ is a rate of change of the mutual capacitance, where a conventional requirement for $\alpha Cm/Cm$ is greater than 5%. The capacitance between the simulated copper pillar and the touch driving electrode is Cftx, and the capacitance between the simulated copper pillar and the touch sensing electrode is Cfrx. The important parameter for evaluating touch performance is the coupling capacitance (i.e. Cftx and Cfrx) between the simulated copper pillar and the electrodes of the touch substrate. The larger the capacitance, the better the touch performance. Cs-tx is the coupling capacitance of the touch driving electrode relative to the cover plate, and Cs-rx is the coupling capacitance of the touch sensing electrode relative to the cover plate.

TABLE 1

| Capacitance parameter | Touch display device with air gap | Conventional touch display device |
|---|---|---|
| Cm (pF) | 0.927 | 0.920 |
| ΔCm (pF) | 0.019 | 0.111 |
| ΔCm/Cm | 2.02% | 12.03% |
| Cftx (pF) | 0.136 | 1.26 |
| Cfrx (pF) | 0.137 | 1.27 |
| Cs-tx | 9.94 | 10.07 |
| Cs-rx | 10.00 | 10.13 |

It can be seen from Table 1 that the impact of the cover plate on the load of the touch electrodes is relatively small and can be ignored. Moreover, the Cftx and Cfrx of the touch display device with an air gap are significantly reduced, and ΔCm/Cm is less than 5%. Therefore, the touch function cannot be achieved.

Reference is made to Table 2, which shows a comparison table simulation data between the conventional touch display device and the touch display device with an air gap, obtained by using a touch chip.

TABLE 2

| | | | First type of touch display device | | Second type of touch display device | | |
|---|---|---|---|---|---|---|---|
| | | Unit | Normal (Conventional) | Air gap 200 μm | Normal (Conventional) | Air gap 250 μm | Remark |
| Capacitance | Tx | pF | 302.70 | 229.05 | 328.54 | 324.38 | 32 × Cs-tx |
| | Rx | pF | 225.69 | 307.11 | 442.06 | 436.60 | 42 × Cs-tx |
| Impedance | Tx | kΩ | 2.35 | 2.35 | 2.35 | 2.35 | Impedance of |
| | Rx | kΩ | 1.57 | 1.57 | 1.57 | 1.57 | two types is consistent |
| Copper pillar | | φ | 5 mm | | 7 mm | | |
| ΔCm | | pF | 0.069 | 0.019 | 0.111 | 0.019 | ΔCm of two types is consistent |
| SNR | Best | dB | 38.05 | 21.64 | 37.40 | 16.93 | |
| | Worst | dB | 37.75 | 21.34 | 36.20 | 15.78 | |

32×Cs-tx represents 32 touch driving electrodes, and 42×Cs-tx represents 42 touch driving electrodes. SNR represents signal-to-noise ratio, which generally requires for a signal-to-noise ratio value greater than 36. 'Best' represents the situation with the best signal-to-noise ratio, and 'Worst' represents the situation with the worst signal-to-noise ratio.

The second type of touch display device has larger capacitance and higher evaluated noise. Therefore, the SNR of the second type of touch display device is lower than the SNR of the first type of touch display device.

It can be concluded from Table 2 that when there is an air gap, the TIC (touch chip) of the two types of touch display devices cannot sense touch signals and cannot achieve the touch function.

According to embodiments of the present disclosure, the first touch layer group 3 is arranged on a side of the cover plate 2 close to the second display section 12. The first touch layer group 3 is adhered to the cover plate 2. In the winding state, external touch actions can be sensed through the first touch layer group 3 to achieve the touch function. The gap 4 is provided between the first touch layer group 3 and the second display section 12. As a result, the first touch layer group 3 and the cover plate 2 will not affect the spreading of the second display section 12, and can also provide protection for the second display section 12.

The cover plate 2 can include a flat portion 21 and a curved portion 22. The flat portion 21 and the second display section 12 are arranged opposite to each other. The curved portion 22 is connected to the flat portion 21, and the curved portion 22 and the third display section 13 are arranged opposite to each other. A coverage area of the curved portion 22 can be designed according to needs. In addition, in some embodiments of the present disclosure, the curved portion 22 can be not provided, that is, the cover plate 2 can include the flat portion 21 only.

The first touch layer group 3 completely covers a side surface of the cover plate 2 close to the second display section 12. Therefore, in some embodiments, the first touch layer group 3 can include a first touch portion and a second touch portion. The first touch portion and the flat portion 21 are arranged oppositely, and the first touch portion is also provided in a flat shape. The second touch portion and the curved portion 22 are arranged oppositely, and the second touch portion is also provided in a curved shape.

Because the second display section 12 of the flexible display panel 1 needs to slide out of the cover plate 2, in a third direction Z, there is a set distance H between the part of the first touch layer group 3 closest to the flexible display panel 1 and the side surface of the second display section 12 close to the cover plate 2, to ensure that the second display section can slide out of the cover plate 2 smoothly. The part of the first touch layer group 3 closest to the flexible display panel 1 is an edge of the first touch layer group 3 away from the fixed bracket 5. The third direction Z is perpendicular to a display surface of the first display section 11.

Figures 3, 4:
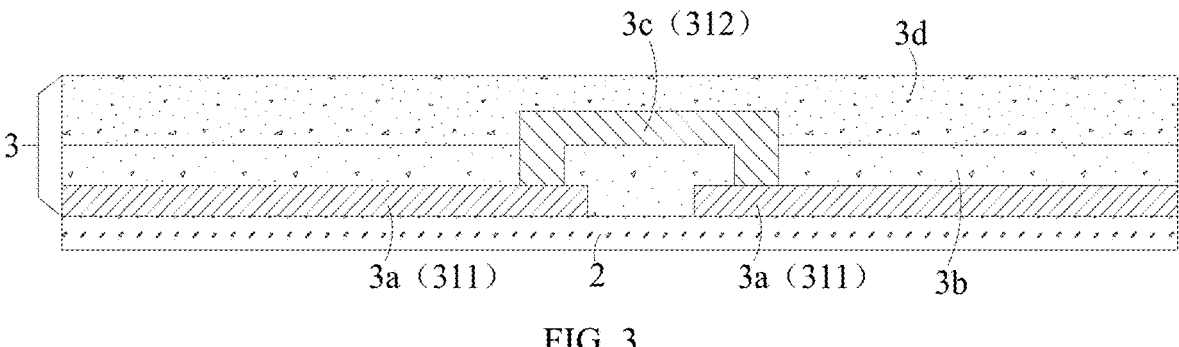
FIG. 3 is a schematic diagram of a structure of a flexible display panel in FIG. 1.
FIG. 4 is a schematic diagram of a cutting structure of a first touch layer group in FIG. 1.

As shown in FIG. 3, the first touch layer group 3 can include a first touch conductor layer 3a, a first touch insulation layer 3b, a second touch conductor layer 3c, and a second touch insulation layer 3d arranged in stacked manner in sequence. In some embodiments, the first touch conductor layer 3a is arranged on a side of the cover plate 2 close to the flexible display panel 1. The first touch insulation layer 3b is arranged on a side of the first touch conductor layer 3a away from the cover plate 2. The second touch conductor layer 3c is arranged on a side of the first touch insulation layer 3b away from the cover plate 2. The second touch insulation layer 3d is arranged on a side of the second touch conductor layer 3c away from the cover plate 2. The second touch insulation layer 3d protects the second touch conductor layer 3c and the entire first touch layer group 3.

As shown in FIG. 4, the first touch conductor layer 3a can include a first touch electrode 311, a second touch electrode 321, and a second connection portion 322. The first touch electrode 311, the second touch electrode 321, and the second connection portion 322 are arranged in the same layer and using the same material. The second touch conductor layer 3c can include a first connection portion 312. A first touch sensing lead 33 and a first touch driving lead 34 can be arranged in the first touch conductor layer 3a, and the first touch sensing lead 33 and the first touch driving lead 34 can also be arranged in the second touch conductor layer 3c. The first touch sensing lead 33 and the first touch driving lead 34 are connected to a first touch chip 71. The first touch chip 71 achieves signal transmission with the first touch layer group 3 through the first touch sensing lead 33 and the first touch driving lead 34.

In some embodiments, the first touch layer group 3 can be a mutual capacitor structure. As shown in FIG. 4, the first touch layer group 3 can include multiple first touch units 31 and multiple second touch units 32. The first touch unit 31 has a line shape extending along a second direction Y, and the multiple first touch units 31 are arranged in sequence along a first direction X. The second touch unit 32 has a line shape extending along the first direction X, and the multiple second touch units 32 are arranged in sequence along the second direction Y. The first direction X intersects with the second direction Y. Each first touch unit 31 can include multiple first touch electrodes 311 and multiple first connection portions 312 arranged in sequence along the second direction Y. The multiple first touch electrodes 311 are arranged in spaced manner, and adjacent first touch electrodes 311 are connected to each other through the first connection portion 312. Each second touch unit 32 can include multiple second touch electrodes 321 and second connection portions 322 arranged in sequence along the first direction X. The multiple second touch electrodes 321 are arranged in spaced manner, and adjacent second touch electrodes 321 are connected to each other through the second connection portion 322.

The first touch electrode 311 and the second touch electrode 321 form a capacitor. By detecting changes in the capacitance, the position of the touch point can be determined.

In some embodiments, the first touch electrode 311, the second touch electrode 321, and the second connection portion 322 are arranged in the same layer and are all arranged in the first touch conductor layer 3a. The second touch electrode 321 and the second connection portion 322 are formed as an integrated structure. As shown in FIG. 3, the first connection portion 312 can be arranged in the second touch conductor layer 3c to form a bridging structure. The first touch insulation layer 3b is arranged between the first connection portion 312 and the second connection portion 322. That is, a via hole is arranged in the first touch insulation layer 3b, and the first connection portion 312 is connected to the first touch electrode 311 through the via hole.

In some embodiments, the first touch electrode 311, the first connection portion 312, and the second touch electrode 321 are arranged in the same layer and are all arranged in the first touch conductor layer 3a. The first touch electrode 311 and the first connection portion 312 are formed as an integrated structure. The second connection portion 322 can be arranged in the second touch conductor layer 3c to form a bridging structure. The first touch insulation layer 3b is also arranged between the first connection portion 312 and the second connection portion 322.

In some embodiments, the first touch electrode 311 can be the driving electrode, and the second touch electrode 321 can be the sensing electrode. In some embodiments, the first touch electrode 311 can be the sensing electrode, and the second touch electrode 321 can be the driving electrode.

Multiple first touch units 31 and multiple second touch units 32 form M rows of driving electrodes*N columns of sensing electrodes, that is, M first touch units 31 and N second touch units 32 are included, where M and N are positive integers greater than two.

In some embodiments, the first touch electrode 311 and the second touch electrode 321 can have a diamond shape, such as a regular diamond, a transversal diamond, or a longitudinal diamond. In some embodiments, the first touch electrode 311 and the second touch electrode 321 can have any one or more shapes of triangle, square, trapezoid, parallelogram, pentagon, hexagon, and other polygons, which is not limited in the present disclosure.

In some embodiments, the first touch electrode 311 and the second touch electrode 321 can be transparent conductive electrodes. Because the first touch layer group 3 can move relative to the flexible display panel 1, both the first touch conductor layer and the second touch conductor layer are made of transparent conductive materials, so that blocking on the flexible display panel 1 can be avoided, which will affect the light output efficiency of the flexible display panel 1. In some embodiments, the first touch electrode 311 and the second touch electrode 321 can be in metal grid form, and the metal grid is formed by interweaving multiple metal wires. The metal grid includes multiple grid patterns, and the grid patterns are polygons composed of multiple metal wires. The first touch electrode 311 and the second touch electrode 321 in the metal grid form have advantages such as low resistance, small thickness, and fast response speed. The metal grid is arranged in correspondence with the sub pixel, so that the light emitted by the sub pixel can emit out through the grid, avoiding affecting the display effect.

The specific structure of the flexible display panel 1 will be explained in detail in the following.

Figure 5:
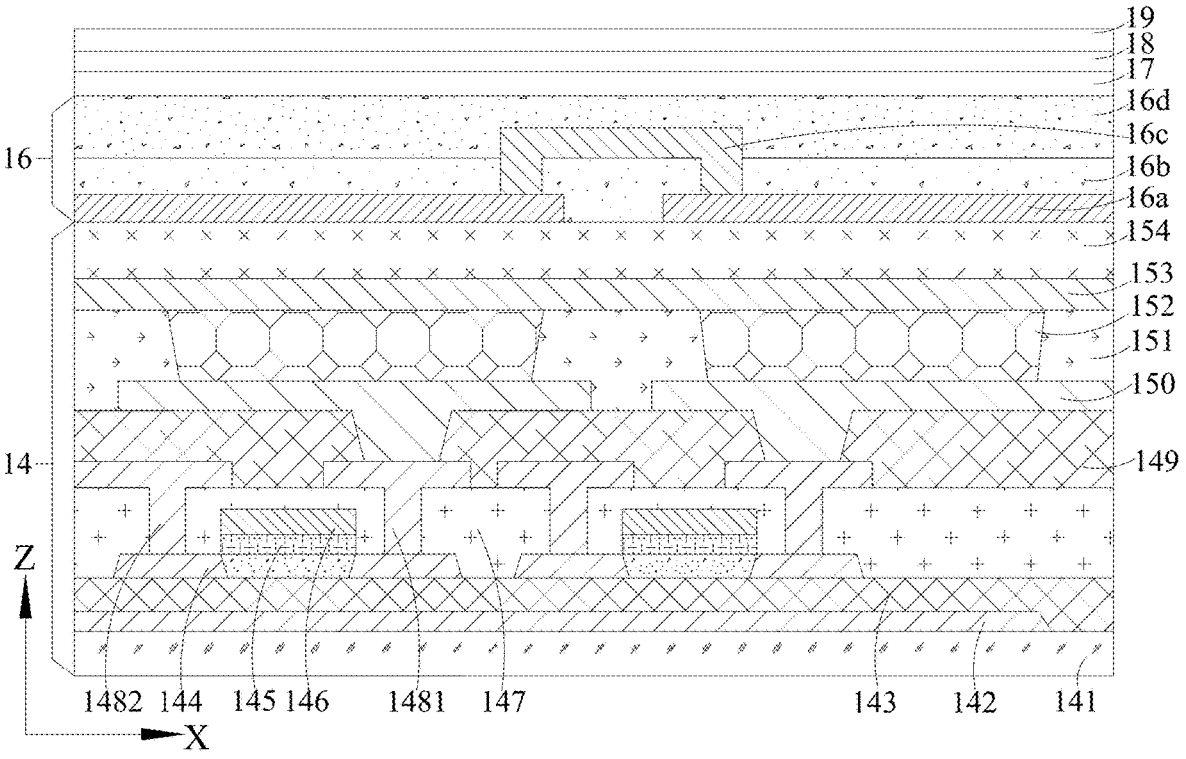
FIG. 5 is a schematic diagram of a structure of a first touch layer group in FIG. 1.

In some embodiments of the present disclosure, as shown in FIG. 5, the flexible display panel 1 can include a display backplane 14 and a second touch layer group 16. The second touch layer group 16 is arranged on a display surface of the display backplane 14. A polarizer 17, an adhesive layer 18, and a covering layer 19 are arranged on a side of the second touch layer group 16 away from the display backplane 14 in stacked manner in sequence.

The display backplane 14 can include a base substrate 141, and the material of the base substrate 141 can include inorganic materials, such as glass, quartz, or metal. The material of the base substrate 141 can also include organic materials, such as polyimide, polycarbonate, polyacrylate, polyetherimide, polyethersulfone, polyethylene terephthalate, and polyethylene naphthalate resin materials. The base substrate 141 can be formed by multiple material layers. For example, the base substrate 141 can include multiple base layers, and the material of the base layer can be any of the above materials. In some embodiments, the base substrate 141 can also be formed as a single layer, which can be any of the above materials.

A shielding layer 142 can further be formed on one side of the base substrate 141. The light emitted from the base substrate 141 into the active layer 144 will generate photo generated carriers in the active layer 144, which will have a huge impact on the characteristics of the thin film transistor and ultimately affect the display quality of the display device. The shading layer 142 can block the light emitted from the base substrate 141, thereby avoiding any impact on the characteristics of the thin film transistor and avoiding affecting the display quality of the display device.

A buffer layer 143 can further be formed on a side of the shading layer 142 away from the base substrate 141. The buffer layer 143 can block water vapor and impurity ions in the base substrate 141 (especially organic materials), and adds hydrogen ions to the subsequent active layer 144. The buffer layer 143 is made of an insulation material, which can isolate the shading layer 142 from the active layer 144.

An active layer 144 is arranged on a side of the buffer layer 143 away from the base substrate 141. The active layer 144 can include a channel region and conductor regions at both ends of the channel region. A gate insulation layer 145 is arranged on a side of the active layer 144 away from the base substrate 141, a gate 146 is arranged on one side of the gate insulation layer 145, and an interlayer dielectric layer 147 is arranged on a side of the gate 146 away from the base substrate 141. A first via hole is arranged in the interlayer dielectric layer 147, and the first via hole is connected to the conductor regions. A source 1481 and a drain 1482 are arranged on a side of the interlayer dielectric layer 147 away from the base substrate 141, and the source 1481 and the drain 1482 are respectively connected to the two conductor regions through two first via holes. A planarization layer 149 is arranged on a side of the source 1481 and the drain 1482 away from the base substrate 141. A second via hole is arranged in the planarization layer 149, and the second via hole is connected to the source 1481. The active layer 144, the gate 146, the source 1481, and the drain 1482 form a thin film transistor.

It should be noted that the thin film transistor described in the specification is a top-gate type thin film transistor. In some embodiments of the present disclosure, the thin film transistor can also be a bottom-gate type or a double-gate type, and a specific structure of the thin film transistor will not be elaborated here. In some embodiments, in the case where the thin film transistor with opposite polarity is used or the direction of current changes during the circuit operation, functions of "source 1481" and "drain 1482" are sometimes interchangeable. Therefore, in this specification, the "source 1481" and the "drain 1482" can be interchanged with each other.

A light-emitting device is arranged on a side of the planarization layer 149 away from the base substrate 141. The light-emitting device can include a first electrode 150, a pixel definition layer 151, a light-emitting layer group 152, and a second electrode 153.

In some embodiments, the first electrode 150 is arranged on a side of the planarization layer 149 away from the base substrate 141. The first electrode 150 is connected to the source 1481 of the driving backplane through the second via hole, and the first electrode 150 can be an anode.

The pixel definition layer 151 is arranged on a side of first electrode 150 away from the base substrate 141. A third via hole is arranged in the pixel definition layer 151. The light-emitting layer group 152 is arranged within the third via hole. The second electrode 153 is arranged on a side of the light-emitting layer group 152 away from the base substrate 141. The second electrode 153 can be a cathode and is connected to the ground line VSS. The light-emitting layer group 152 within the third via hole emits light to form a sub pixel, and the display panel can include multiple sub pixels.

The light-emitting layer group 152 can include a hole injection layer, a hole transport layer, a luminescent layer, an electron transport layer, and an electron injection layer arranged in stacked manner in sequence. The hole injection layer is in contact with the first electrode 150 and the electron injection layer is in contact with the second electrode 153. In some embodiments of the present disclosure, the light-emitting layer group 152 can include the hole transport layer, the luminescent layer, and the electron transport layer only. The light-emitting layer group 152 can also have other structures, and the specific structure can be provided according to needs.

An encapsulation layer group 154 is arranged on a side of the second electrode 153 away from the base substrate 141. The encapsulation layer group 154 can be provided in multiple layers, and the encapsulation layer group 154 can include organic and inorganic layers. The specific materials and layers will not be elaborated here.

A second touch layer group 16 is arranged on a side of the encapsulation layer group 154 away from the base substrate 141. The second touch layer group 16 can include a third touch metal layer 16a, a third touch insulation layer 16b, a fourth touch metal layer 16c, and a fourth touch insulation layer 16d arranged in stacked manner in sequence. The third touch metal layer 16a can be arranged adjacent to the encapsulation layer group 154. The third touch metal layer 16a is arranged on one side of the display backplane 14. That is, the third touch metal layer 16a is arranged on a side of the encapsulation layer group 154 away from the base substrate 141, the third touch insulation layer 16b is arranged on a side of the third touch metal layer 16a away from the display backplane 14, the fourth touch metal layer 16c is arranged on a side of the third touch insulation layer 16b away from the display backplane 14, and the fourth touch insulation layer 16d is arranged on a side of the fourth touch metal layer 16c away from the display backplane 14.

Figure 6:
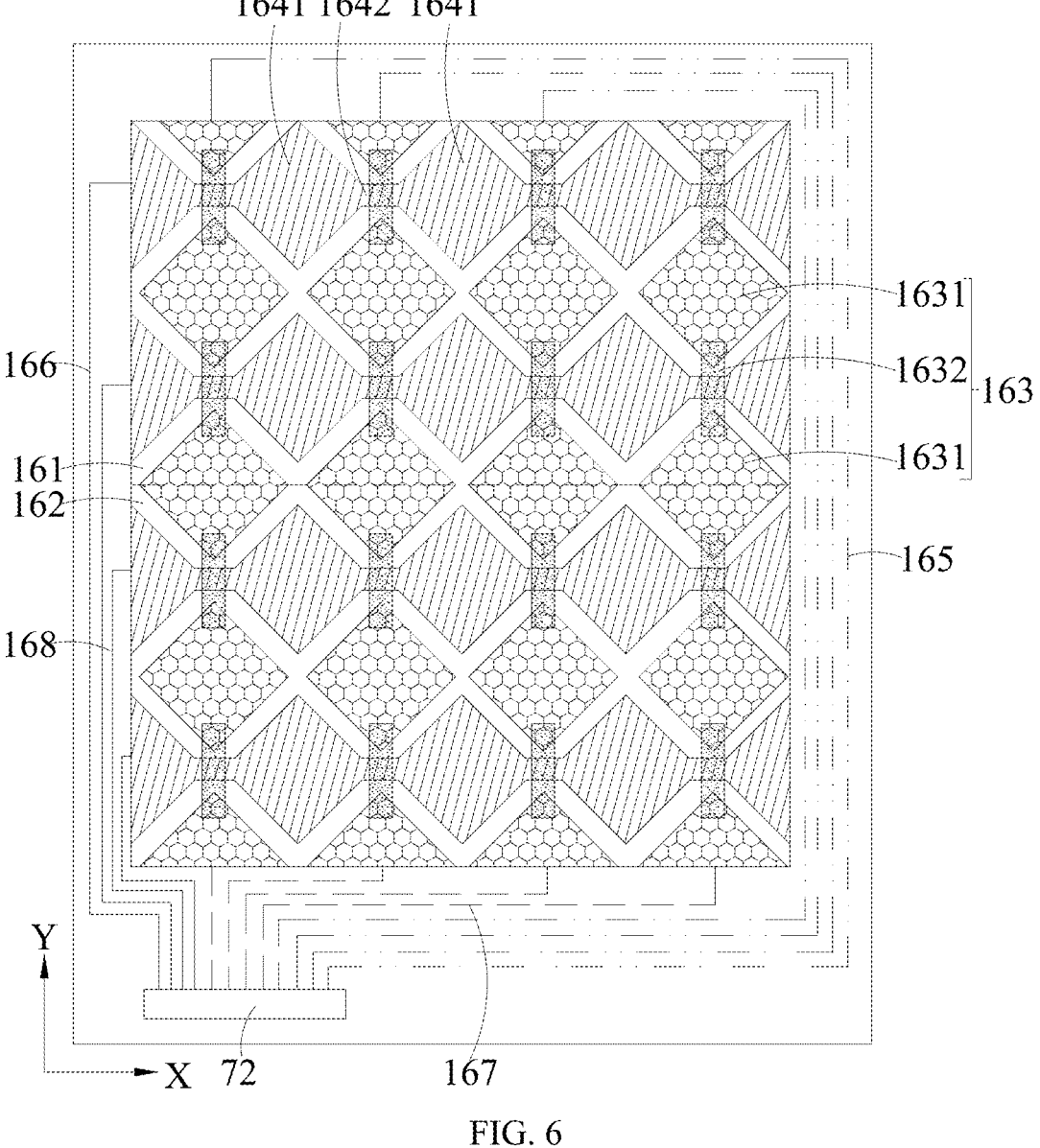
FIG. 6 is a schematic diagram of a structure of a second touch layer group in FIG. 1.

As shown in FIG. 6, the third touch metal layer 16a can include a third touch electrode 1631, a fourth touch electrode 1641, and a fourth connection portion 1642. The third touch electrode 1631, the fourth touch electrode 1641, and the fourth connection portion 1642 arranged in the same layer and using the same material. The fourth touch metal layer 16c can include a third connection portion 1632. The second touch sensing lead 166, the second touch driving lead 165, the third touch sensing lead 168, and the third touch driving lead 167 can be arranged in the third touch metal layer 16a or in the fourth touch metal layer 16c. The second touch sensing lead 166, the second touch driving lead 165, the third touch sensing lead 168, and the third touch driving lead 167 are all connected to the second touch chip 72. The second touch chip 72 achieves signal transmission with the second touch layer group 16 through the above leads.

In some embodiments, the second touch layer group 16 can be a mutual capacitor structure. As shown in FIG. 6, the second touch layer group 16 can include multiple third touch units 163 and multiple fourth touch units 164. The fourth touch unit 164 has a line shape extending along the first direction X, and the multiple fourth touch units 164 are arranged in sequence along the second direction Y. The third touch unit 163 has a line shape extending along the second direction Y, and the multiple third touch units 163 are arranged in sequence along the first direction X. The first direction X intersects with the second direction Y. Each third touch unit 163 can include multiple third touch electrodes 1631 and multiple third connection portions 1632 arranged in sequence along the second direction Y. The multiple third touch electrodes 1631 are arranged in spaced manner, and adjacent third touch electrodes 1631 are connected to each other through the third connection portion 1632. Each fourth touch unit 164 can include multiple fourth touch electrodes 1641 and fourth connection portions 1642 arranged in sequence along the first direction X. The multiple fourth touch electrodes 1641 are arranged in spaced manner, and adjacent fourth touch electrodes 1641 are connected to each other through the fourth connection portion 1642.

The third touch electrode 1631 and the fourth touch electrode 1641 form a capacitor. By detecting changes in the capacitance, the position of the touch point can be determined.

In some embodiments, the third touch electrode 1631, the fourth touch electrode 1641, and the fourth connection portion 1642 are arranged in the same layer and are all arranged in the third touch metal layer 16a. The fourth touch electrode 1641 and the fourth connection portion 1642 are formed as an integrated structure. The third connection portion 1632 can be arranged in the fourth touch metal layer 16c to form a bridging structure. The third touch insulation layer 16b is arranged between the third connection portion 1632 and the fourth connection portion 1642. That is, a via hole is arranged in the third touch insulation layer 16b, and the third connection portion 1632 is connected to the third touch electrode 1631 through the via hole.

In some embodiments, the third touch electrode 1631, the third connection portion 1632, and the fourth touch electrode 1641 are arranged in the same layer and are all arranged in the third touch metal layer 16a. The third touch electrode 1631 and the third connection portion 1632 are formed as an integrated structure. The fourth connection portion 1642 can be arranged in the fourth touch metal layer 16c to form a bridge structure. The third touch insulation layer 16b is also arranged between the third connection portion 1632 and the fourth connection portion 1642.

In some embodiments, the third touch electrode 1631 can be the driving electrode, and the fourth touch electrode 1641 can be the sensing electrode. In some embodiments, the third touch electrode 1631 can be the sensing electrode, and the fourth touch electrode 1641 can be the driving electrode.

Multiple third touch units 163 and multiple fourth touch units 164 form M rows of driving electrodes*N columns of sensing electrodes, that is, M third touch units 163 and N fourth touch units 164 are included, where M and N are positive integers greater than two.

In some embodiments, the third touch electrode 1631 and the fourth touch electrode 1641 can have a diamond shape, such as a regular diamond, a transversal diamond, or a longitudinal diamond. In some embodiments, the third touch electrode 1631 and the fourth touch electrode 1641 can have any one or more shapes of triangle, square, trapezoid, parallelogram, pentagon, hexagon, and other polygons, which is not limited in the present disclosure.

In some embodiments, the third touch electrode 1631 and the fourth touch electrode 1641 can be transparent conductive electrodes. In some embodiments, the third touch electrode 1631 and the fourth touch electrode 1641 can be in metal grid form, and the metal grid is formed by interweaving multiple metal wires. The metal grid includes multiple grid patterns, and the grid patterns are polygons composed of multiple metal wires. The third touch electrode 1631 and the fourth touch electrode 1641 in the metal grid form have advantages such as low resistance, small thickness, and fast response speed. The metal grid is arranged in correspondence with the sub pixel, so that the light emitted by the sub pixel can emit out through the grid, avoiding affecting the display effect.

The second touch layer group 16 can include a first part 161 and a second part 162.

As shown in FIG. 6, the first part 161 and the second part 162 can be connected together. The second touch driving lead 165 is connected to the first part 161, and the second touch sensing lead 166 is connected to the first part 161. The third touch driving lead 167 is connected to the second part 162, and the third touch sensing lead 168 is connected to the second part 162. In some embodiments, the second touch chip controls the first part 161 and the second part 162 respectively through different leads. The second touch chip controls the first part 161 through the second touch driving lead 165 and the second touch sensing lead 166, and controls the second part 162 through the third touch driving lead 167 and the third touch sensing lead 168.

Figure 7:
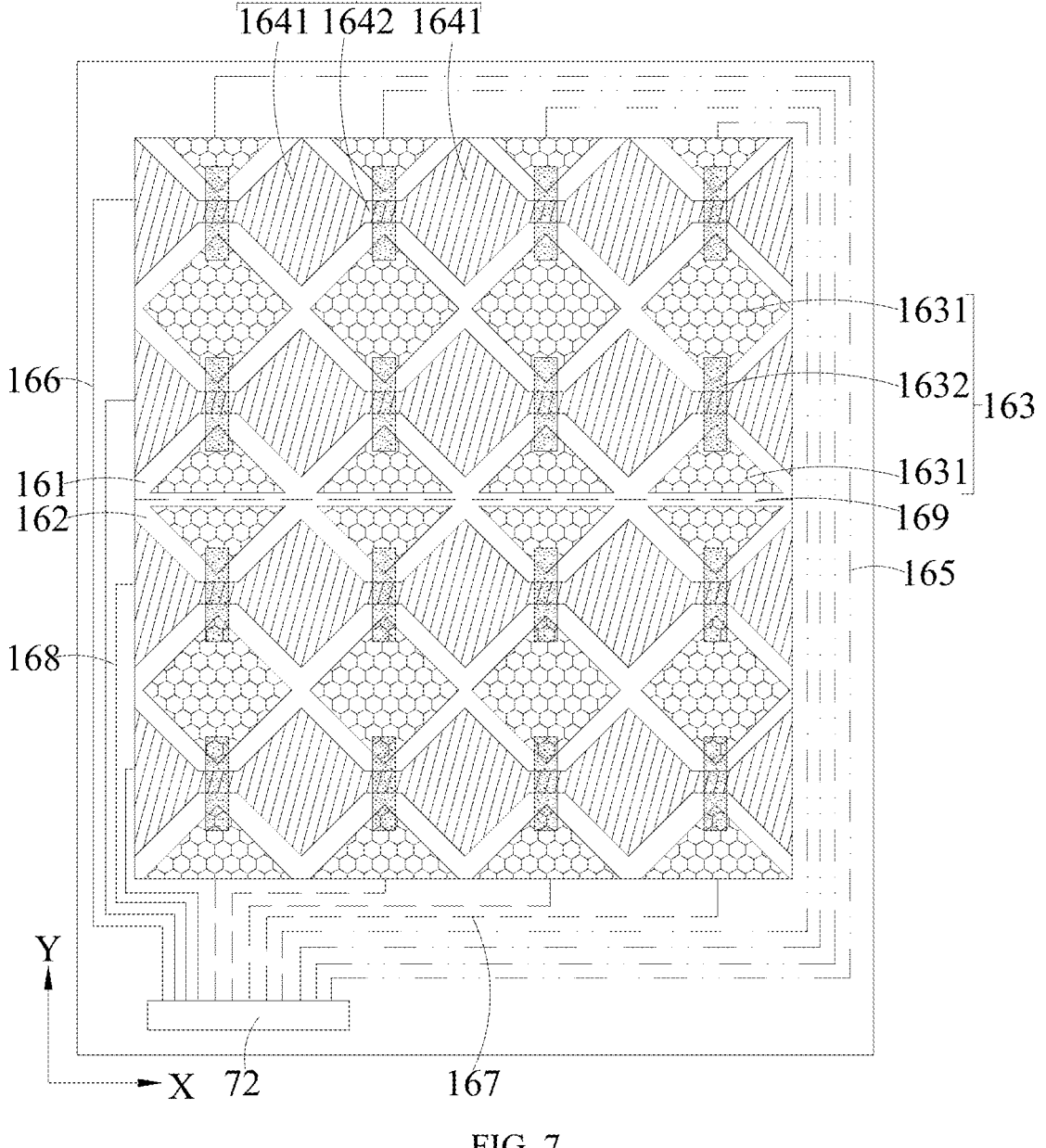
FIG. 7 is a schematic diagram of a structure of a second touch layer group in FIG. 1.

As shown in FIG. 7, the first part 161 and the second part 162 are arranged in spaced manner, that is, a spacing portion 169 is arranged between the first part 161 and the second part 162. It should be noted that the spacing portion 169 is very small, as long as there is no electrical connection between the touch electrodes in the first part 161 and the touch electrodes in the second part 162, so that when the flexible display panel in the spreading state, the touch function of the second touch layer group 16 will not be affected.

The third touch unit 163 located on the same line is divided into two parts. The third touch unit 163 located in the first part 161 is connected to the second touch sensing lead 166, and the third touch unit 163 located in the second part 162 is connected to the third touch sensing lead.

The fourth touch unit 164 located in the first part 161 is connected to the second touch driving lead 165, and the fourth touch unit 164 located in the second part 162 is connected to the third touch driving lead 167.

As shown in FIG. 1, an orthographic projection of the first touch layer group 3 on the flexible display panel 1 coincides with the second part 162, so that when the flexible display panel 1 is in the winding state, the first touch layer group 3 can replace the second part 162 to achieve the touch function.

In some embodiments of the present disclosure, an edge of the orthographic projection of the first touch layer group 3 on the flexible display panel 1, the edge being close to the first part 161, coincides with an edge of the first part 161 close to the second part 162. For the case where the first part 161 and the second part 162 are connected together, a situation is consistent with the fact that the orthographic projection of the first touch layer group 3 on the flexible display panel 1 coincides with the second part 162. For the case where the first part 161 and the second part 162 are arranged in spaced manner, the front projection of the first touch layer group 3 on the flexible display panel 1 coincides with the second part 162 and the spacing portion 169. As a result, when the flexible display panel 1 is in the winding state, the first touch layer group 3 can replace the second part 162 to achieve the touch function.

It should be noted that light rays forming the orthographic projection of the first touch layer group 3 on the flexible display panel 1 are perpendicular to the first touch layer group 3. That is, when an orthographic projection of the curved portion 22 is formed, light rays forming the orthographic projection are perpendicular to the curved portion 22.

The first part 161 is located on the first display section 11 and on at least a part of the third display section 13. The second part 162 is located at least on the second display section 12. In the case where the first touch layer group 3 is arranged opposite to the entire second display section 12 and a part of the third display section 13, the first part 161 is located on the first display section 11 and a part of the third display section 13, and the second part 162 is located on the second display section 12 and a part of the third display section 13. In some embodiments, in the case where the first touch layer group 3 is arranged opposite to the second display section 12 only, the first part 161 is located on the first display section 11 and the third display section 13, and the second part 162 is located on the second display section 12.

In some embodiments, the specific type of the display device is not subject to special restrictions, and the types of commonly used display devices in the art can be used, for example, mobile devices such as mobile phones, wearable devices such as watches, VR devices, etc. Those skilled in the art can choose according to the specific purpose of the display device, which will not be repeated here.

It should be noted that the display device can further include other necessary parts and components. Taking the display as an example, such as a casing, a circuit board, a power cord, etc. Those skilled in the art can supplement accordingly according to the specific usage requirements of the display device, which will not be repeated here.

Figure 8:
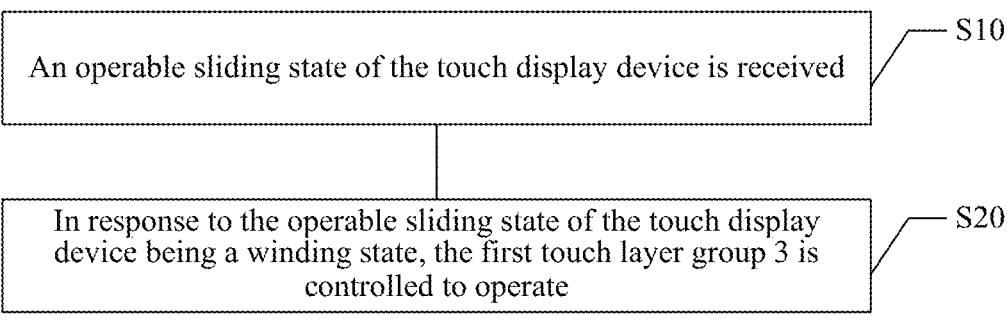
FIG. 8 is a schematic flowchart of a method for controlling a display device according to embodiments of the present disclosure.

Based on the same inventive concept, embodiments of the present disclosure provide a method for controlling a touch display device, which can be used to control any of the touch display devices described above. As shown in FIG. 8, the method for controlling the touch display device can include following steps.

In step S10, an operable sliding state of the touch display device is received.

In step S20, in response to the operable sliding state of the touch display device being a winding state, the first touch layer group 3 is controlled to operate.

The method for controlling the touch display device will be explained in detail in the following.

In step S10, an operable sliding state of the touch display device is received.

In some embodiments, the operable sliding state of the touch display device can include two states, namely a winding state and a spreading state. As shown in FIG. 1, when the operable sliding state of the touch display device is the winding state, the first display section 11 is located on the front surface of the touch display device, the third display section 13 is located on the side surface of the touch display device, and the second display section 12 is located on the rear surface of the touch display device. That is, the second display section 12 is covered by the cover plate 2. As shown in FIG. 2, when the operable sliding state of the touch display device is the spreading state, the first display section 11, the second display section 12, and the third display section 13 are all located on the front surface of the touch display device.

In step S20, in response to the operable sliding state of the touch display device being a winding state, the first touch layer group 3 is controlled to operate.

In some embodiments, when the operable sliding state of the touch display device is in the winding state, the second part 162 of the second touch layer group 16 cannot achieve the touch function, the first touch layer group 3 is controlled to operate, and the first touch layer group 3 can sense external touch actions and achieve the touch function.

In some embodiments, while controlling the first touch layer group 3 to operate, the second part 162 is controlled to stop operating. Although the touch signal of the second part 162 is weak, the second part 162 will still exert a certain impact. Controlling the second part 162 to stop operating can avoid affecting the touch function of the first touch layer group 3. The first part 161 is controlled to operate, the first part 161 and the first touch layer group 3 can achieve full coverage of the touch display device, so that the touch function can be achieved in all parts of the touch display device.

In some embodiments, controlling the second part 162 to stop operating can include: shielding the touch sensing signal of the second part 162. That is, the second touch chip 72 does not accept the touch sensing signal of the second part 162. In some embodiments, the second touch chip 72 does not accept the touch sensing signal transmitted by the third touch sensing lead 168. In some embodiments, controlling the second part 162 to stop operating can also include: controlling the touch function of the second part 162 to be turned off. For example, the second touch chip 72 does not input the touch driving signal to the second part 162. In some embodiments, the second touch chip 72 does not input the touch driving signal to the third touch driving lead 167.

If the operable sliding state of the touch display device is the spreading state, the cover plate 2 does not cover the display surface of the touch display device, and the first touch layer group 3 does not cover the display surface of the touch display device. Therefore, the first touch layer group 3 is controlled to stop operating. The second touch layer group 16 can achieve full coverage of the touch display device. Therefore, controlling the operating of the second touch layer group 16 can enable the touch function to be achieved in all parts of the touch display device.

It should be noted that although various steps of the methods of the present disclosure are depicted in a particular order in the drawings, this does not require or imply that the steps must be executed in that particular order, or that all illustrated steps must be executed in order to achieve the desired result. Additionally or alternatively, certain steps can be omitted, multiple steps can be combined into one step for execution, and/or one step can be decomposed into multiple steps for execution, etc.

After considering the specification and practicing of the invention disclosed herein, those skilled in the art will easily come up with other implementation solutions of the present disclosure. The present disclosure aims to cover any variations, uses, or adaptive changes of the present disclosure, which follow the general principles of the present disclosure and include common knowledge or commonly used technical means in the art that are not disclosed in the present disclosure. The specification and embodiments are only considered exemplary, and the true scope and spirit of the present disclosure are defined by appended claims.

What is claimed is:

1. A touch display device, comprising:
a flexible display panel comprising:
  a first display section, a second display section, and a third display section, wherein the first display section and the second display section are arranged opposite to each other, and the third display section is connected between the first display section and the second display section, and wherein the third display section is in a curved shape, the first display section is a fixed section, and the second display section and the third display section are slidable and windable sections;
a display backplane; and
a second touch layer group arranged on a side of the display backplane, wherein the second touch layer group is located on the first display section, the second display section, and the third display section;

a cover plate arranged on a side of the second display section away from the first display section; and a first touch layer group arranged on a side of the cover plate close to the second display section, wherein a gap is provided between the first touch layer group and the second display section;

wherein the first touch layer group comprises:

a first touch conductor layer arranged on a side of the cover plate close to the flexible display panel, wherein the first touch conductor layer is made of a transparent conductive material;

a first touch insulation layer arranged on a side of the first touch conductor layer away from the cover plate;

a second touch conductor layer arranged on a side of the first touch insulation layer away from the cover plate, wherein the second touch conductor layer is made of the transparent conductive material; and a second touch insulation layer arranged on a side of the second touch conductor layer away from the cover plate.

2. The touch display device according to claim 1, wherein the first touch layer group completely covers a side surface of the cover plate close to the second display section, and the cover plate comprises:

a flat portion arranged opposite to the second display section; and a curved portion connected to the flat portion and arranged opposite to a part of the third display section.

3. The touch display device according to claim 2, wherein in a third direction, a set distance is provided between a part of the first touch layer group closest to the flexible display panel and a surface of the second display section close to the cover plate, and the third direction is perpendicular to a display surface of the first display section.

4. The touch display device according to claim 1, wherein the second touch layer group comprises a first part and a second part, the first part is located on the first display section and on at least a part of the third display section, and the second part is located at least on the second display section.

5. The touch display device according to claim 4, wherein an orthographic projection of the first touch layer group on the flexible display panel coincides with the second part, or an edge, close to the first part, of the orthographic projection of the first touch layer group on the flexible display panel coincides with an edge of the first part close to the second part.

6. The touch display device according to claim 4, wherein the first part and the second part are arranged in spaced manner.

7. The touch display device according to claim 6, wherein a spacing portion is arranged between the first part and the second part, and the spacing portion is configured to avoid electrical connections between touch electrodes in the first part and touch electrodes in the second part.

8. The touch display device according to claim 4, wherein the second touch layer group further comprises:

a second touch driving lead connected to the first part;

a second touch sensing lead connected to the first part;

a third touch driving lead connected to the second part; and a third touch sensing lead connected to the second part.

9. The touch display device according to claim 4, wherein the second touch layer group further comprises:

a third touch metal layer arranged on a side of the display backplane;

a third touch insulation layer arranged on a side of the third touch metal layer away from the display backplane;

a fourth touch metal layer arranged on a side of the third touch insulation layer away from the display backplane; and a fourth touch insulation layer arranged on a side of the fourth touch metal layer away from the display backplane.

10. The touch display device according to claim 1, wherein the first touch layer group comprises multiple first touch units and multiple second touch units, each first touch unit comprises multiple first touch electrodes and multiple first connection portions arranged in sequence along a second direction, and wherein the multiple first touch electrodes are arranged in spaced manner, and adjacent first touch electrodes are connected to each other through a first connection portion; and each second touch unit comprises multiple second touch electrodes and second connection portions arranged in sequence along a first direction, and wherein the multiple second touch electrodes are arranged in spaced manner, and adjacent second touch electrodes are connected to each other through a second connection portion.

11. The touch display device according to claim 10, wherein the first touch electrodes and the second touch electrodes are arranged in a grid, and the grid is arranged in correspondence with sub pixels of the touch display device.

12. The touch display device according to claim 1, wherein the second touch layer group comprises multiple third touch units and multiple fourth touch units, each third touch unit comprises multiple third touch electrodes and multiple third connection portions arranged in sequence along a second direction, and wherein the multiple third touch electrodes are arranged in spaced manner, and adjacent third touch electrodes are connected to each other through a third connection portion; and each fourth touch unit comprises multiple fourth touch electrodes and fourth connection portions arranged in sequence along a first direction, and wherein the multiple fourth touch electrodes are arranged in spaced manner, and adjacent fourth touch electrodes are connected to each other through a fourth connection portion.

13. The touch display device according to claim 12, wherein the third touch electrodes and the fourth touch electrodes are arranged in a grid, and the grid is arranged in correspondence with sub pixels of the touch display device.

14. A method of controlling a touch display device, wherein the touch display device comprises:

a flexible display panel comprising:

a first display section, a second display section, and a third display section, wherein the first display section and the second display section are arranged opposite to each other, and the third display section is connected between the first display section and the second display section, and wherein the third display section is in a curved shape, the first display section is a fixed section, and the second display section and the third display section are slidable and windable sections;

a display backplane; and a second touch layer group arranged on a side of the display backplane, wherein the second touch layer group is located on the first display section, the second display section, and the third display section, the second touch layer group comprises a first part and a second part, the first part is located on the first display section and on at least a part of the third display section, and the second part is located at least on the second display section;

a cover plate arranged on a side of the second display section away from the first display section; and a first touch layer group arranged on a side of the cover plate close to the second display section, wherein a gap is provided between the first touch layer group and the second display section;

wherein the first touch layer group comprises:

a first touch conductor layer arranged on a side of the cover plate close to the flexible display panel, wherein the first touch conductor layer is made of a transparent conductive material;

a first touch insulation layer arranged on a side of the first touch conductor layer away from the cover plate;

a second touch conductor layer arranged on a side of the first touch insulation layer away from the cover plate, wherein the second touch conductor layer is made of the transparent conductive material; and a second touch insulation layer arranged on a side of the second touch conductor layer away from the cover plate;

and the method comprises:

receiving an operable sliding state of the touch display device;

controlling, in response to the operable sliding state of the touch display device being a winding state, the first touch layer group to operate; and controlling the second part to stop operating and controlling the first part to operate, when controlling the first touch layer group to operate.

15. The method of controlling a touch display device according to claim 14, wherein controlling the second part to stop operating comprises:

shielding a touch sensing signal of the second part, or controlling a touch function of the second part to be turned off.

16. The method of controlling a touch display device according to claim 14, further comprising:

controlling, in response to the operable sliding state of the touch display device being a spreading state, the second touch layer group to operate, and controlling the first touch layer group to stop operating.

* * * * *